(12) United States Patent
Ayers et al.

(10) Patent No.: US 9,986,290 B2
(45) Date of Patent: May 29, 2018

(54) VIDEO CENSORING

(71) Applicant: INTERNATIONAL BUSINESS MACHINES CORPORATION, Armonk, NY (US)

(72) Inventors: Ruth K. Ayers, Hampshire (GB); Giacomo G. Chiarella, Eastleigh (GB); Daniel T. Cunnington, Chandler's Ford (GB); Eleanor G. Kelly, Dorset (GB); Eunjin Lee, Eastleigh (GB); Alexandra E. Wishart, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/277,117

(22) Filed: Sep. 27, 2016

(65) Prior Publication Data

US 2018/0091856 A1 Mar. 29, 2018

(51) Int. Cl.
*H04N 9/80* (2006.01)
*H04N 9/79* (2006.01)
*H04N 21/454* (2011.01)
*H04N 21/4627* (2011.01)
*H04N 21/81* (2011.01)
*H04B 10/116* (2013.01)
*G09G 5/00* (2006.01)

(52) U.S. Cl.
CPC ....... *H04N 21/4542* (2013.01); *H04B 10/116* (2013.01); *H04N 21/4627* (2013.01); *H04N 21/8146* (2013.01)

(58) Field of Classification Search
USPC .......................... 386/257, 239, 248; 345/629
See application file for complete search history.

(56) References Cited

U.S. PATENT DOCUMENTS

| | | | |
|---|---|---|---|
| 6,559,883 B1 | 5/2003 | Fancher et al. | |
| 6,771,349 B2 | 8/2004 | Sitrick et al. | |
| 8,542,906 B1 | 9/2013 | Persson et al. | |
| 9,083,937 B1* | 7/2015 | Oliphant | H04N 9/79 |
| 2012/0320106 A1 | 12/2012 | Gohshi et al. | |
| 2015/0220760 A1 | 8/2015 | Foote et al. | |
| 2015/0304522 A1* | 10/2015 | Van Herpen | H04N 5/913 |
| | | | 380/210 |

FOREIGN PATENT DOCUMENTS

CA 2 760 686 A1 6/2013

* cited by examiner

*Primary Examiner* — Daquan Zhao
(74) *Attorney, Agent, or Firm* — Margaret A. McNamara, Esq.; Kevin P. Radigan, Esq.; Heslin, Rothenberg, Farley & Mesiti, P.C.

(57) ABSTRACT

Censoring a video recording of an environment, the environment containing a protected entity displaying protected content to be censored. Video of the environment is processed in accordance with an entity recognition process to identify the presence of at least part of an entity in the environment. It is determined if the identified entity is to be censored based on based on entity information of a received VLC signal. Based on the identified entity being determined to be censored, the video recording is modified to replace at least a portion of the identified entity with a graphical element adapted to obscure the portion of the identified entity in the video stream. By modifying a video stream to obscure an entity, protected content in the environment may be prevented from being displayed to a viewer of the video recording.

22 Claims, 8 Drawing Sheets

(i)

(ii)

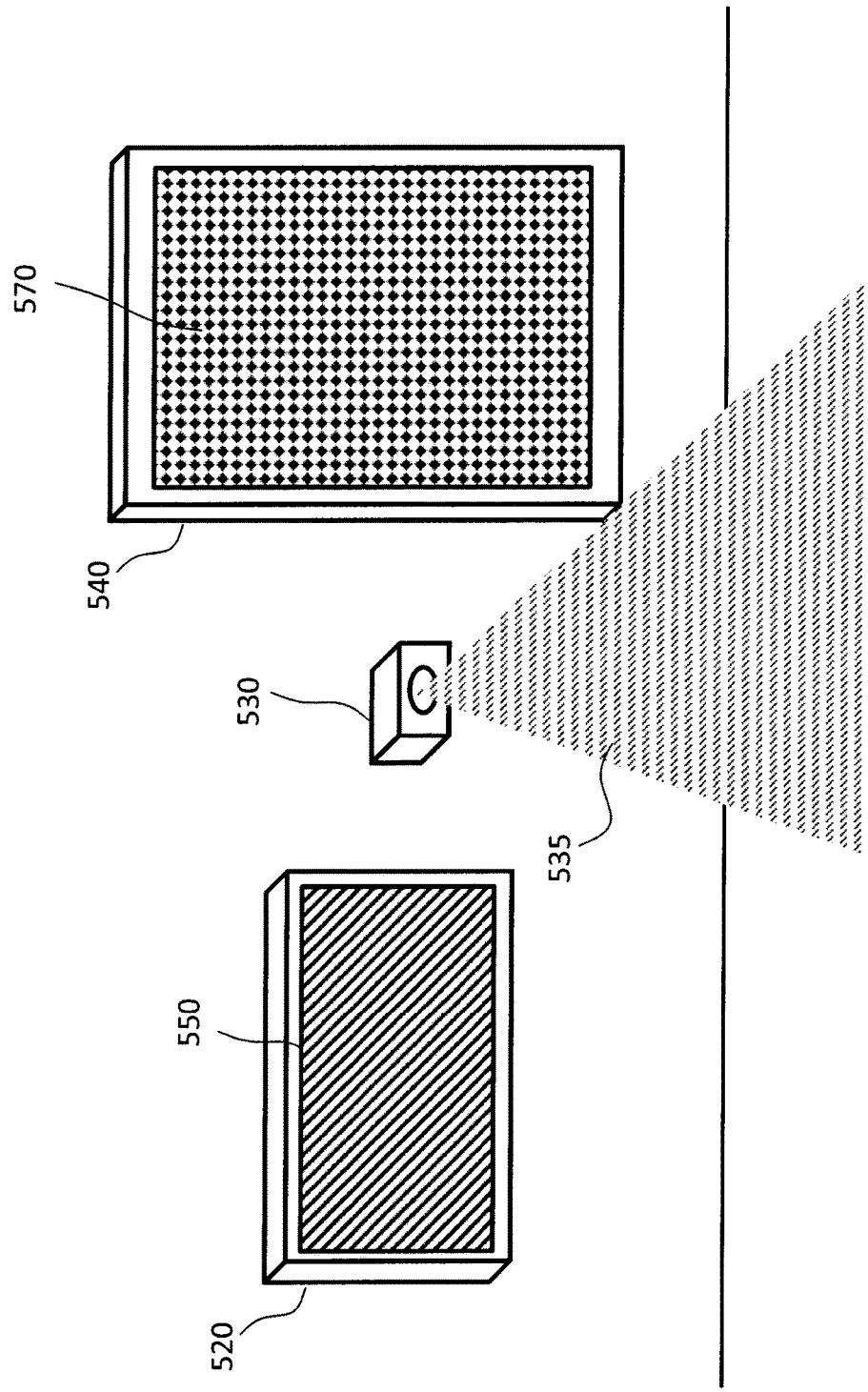

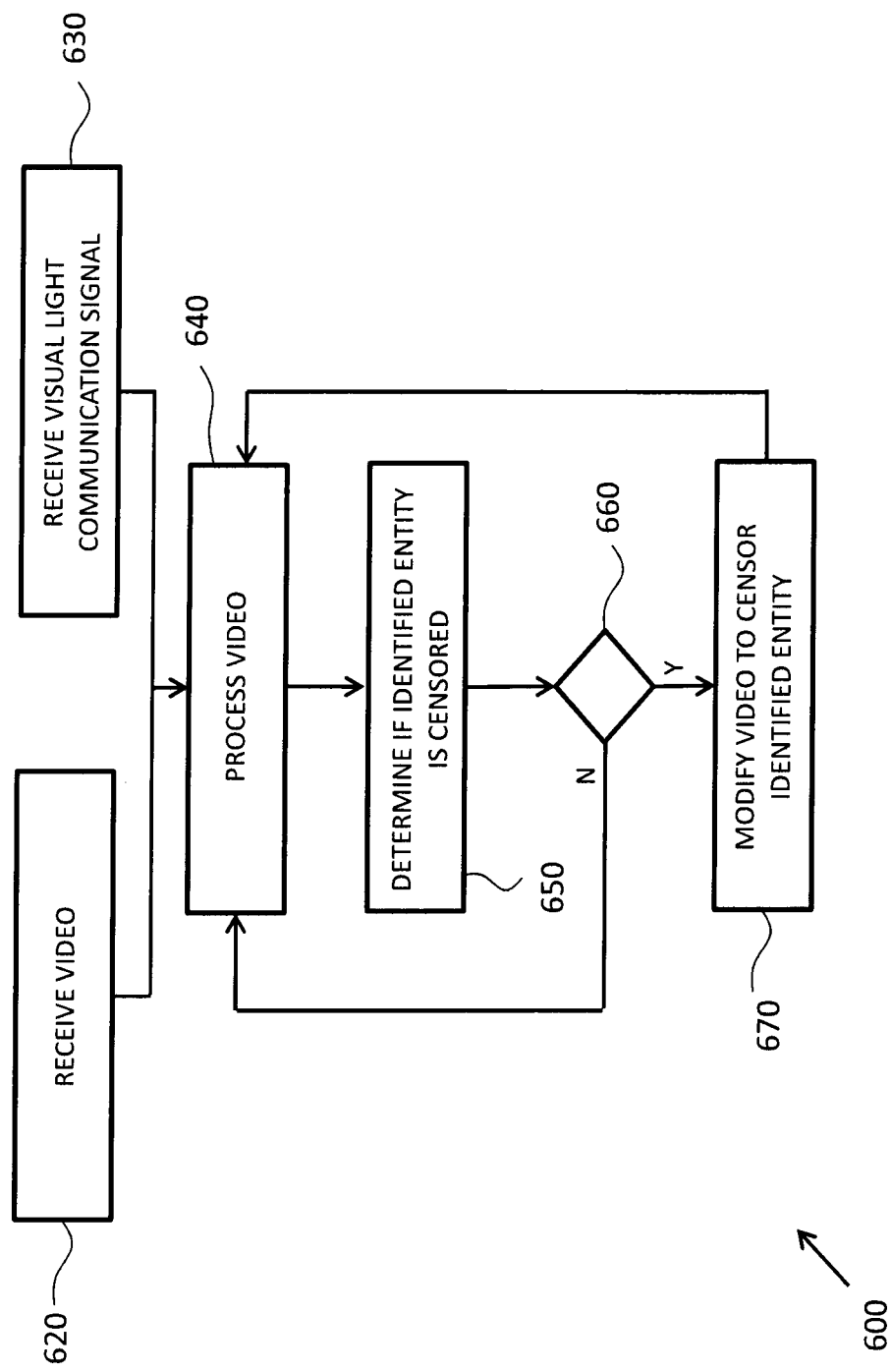

VIDEO CENSORING

BACKGROUND

Devices that can be used to capture (e.g. record) video of an environment are widely known and available. It is also known to adapt or use such video capture devices to augment a user experience of an environment, for example by augmenting a live video-stream of an environment with additional display information.

Known devices or systems that aim to augment a user's experience by displaying video stream of an environment include: Virtual Reality (VR) head-mounted display system; smartphone-based Augmented Reality (AR) systems, Hololens®, Oculus Rift®, and the like.

Many of these devices and systems are adapted to be able to share a user's view with a second viewer. A video stream displayed to a user of a VR head-mounted display system may therefore be shared with another person so that the other person can see what the user (i.e. wearer of the VR head-mounted display) is seeing. The sharing of the video may be implemented via an IP-based video call, a dedicated video communication link, or a video broadcast channel, for example. Thus, such use examples may include a user potentially enabling un-trusted third-parties to view the shared video.

In examples of a video being recorded and/or communicated (e.g. transmitted, sent or broadcast), the videoed environment may contain objects, entities, items, etc. displaying protected content (e.g. secret, sensitive or copyright-protected material) that the owner of the protected content does not wish to be recorded and/or communicated (e.g. viewed by un-trusted, unauthorized, or unknown third-parties).

Post-processing a video to blur-out portions of video that a content-creator/owner does not wish a viewer of the video to see is known. However, such post-processing concepts and techniques require the control or input of a content-creator (e.g. editor) after the video has been created. They also typically require labor/input-intensive resources to process the video before it can be communicated for viewing. Thus, existing post-processing techniques incur significant processing resources and time-delays.

SUMMARY

According to an embodiment of the present invention there is provided a computer-implemented method of censoring a video recording of an environment, the environment containing a protected entity displaying protected content to be censored, the method including: receiving a visual light communication, VLC, signal comprising entity information relating to at least one property of the protected entity or protected content; processing the video recording in accordance with an entity recognition algorithm to identify the presence of at least part of an entity in the environment; determining whether the identified entity is to be censored based on entity information of the received VLC signal; and, based on the identified entity being determined to be censored, modifying the video recording to replace at least a portion of the identified entity with a graphical element adapted to obscure the portion of the identified entity in the video.

Disclosed herein, in one or more aspects, is censoring a video recording of an environment containing protected content (e.g. sensitive, private or copyright-protected information) to be censored using Visual Light Communication (VLC) technology and image processing. By using a VLC signal to communicate information about a protected entity or protect content the environment, the information can be used to identify if the video recording contains content to be censored (such as a protected entity itself or displayed information having a predetermined special relationship with the entity). The video may then be altered so as to prevent the protected content from being viewed by a viewer of the video. For example, the identified protected content may be blurred, masked out, blocked, or replaced by a differing image, so that the video does not display the relevant private, sensitive or copyright-protected information. In this way, and by way of example only, a video stream of the environment can be viewed by a person situated remotely from the environment while maintaining the privacy or confidentiality of the protected information in the viewed video.

In particular, a VLC signal may be used to communicate information relating to a property of the protected entity or protected content. VLC is known communication technology which uses the visible light spectrum as opposed to the radio spectrum (for Bluetooth and Wi-Fi) to transmit and receive data. VLC has been shown to transmit data at speeds up to 10 Mbit/s and has various advantages over radio waves such as the potential to use 'ordinary' items such as street lights to transmit data (e.g. no specialized hardware and installation needed) and the ability for the data to be localized. The information provided by a VLC signal can be used to determine whether an entity identified in a video recording of environment is to be censored, and then to modify the video recording to replace (at least a portion of) the identified entity with a graphical element which obscures (at least a portion of) the identified entity so as to prevent the display of identified entity and/or the sensitive/private/copyright-protected information it may display. By employing various types of information relating to the protected entity, for example, embodiments may accommodate changes in the environments and/or the protected entity.

For instance, a device displaying copyrighted material/content may be provided with an associated VLC transmitter (e.g. connected to or integrated with the device) which transmits a VLC signal to recording devices signifying that the displayed material/content is copyrighted. The VLC signal may also comprise more detailed information about the device and/or the displayed content.

It is noted that, by leveraging information received via a VLC signal about a protected entity to be censored along with information from a video recording, the video recording may be processed and modified in real-time so that it can be broadcast in a live manner (e.g. streamed) to one or more remote viewers without compromising (e.g. exposing or making visible/viewable) private or copyright-protected content in the videoed environment.

Modification of the video recording may depend on a viewer's viewing privileges and/or security credentials for example. One or more embodiments may therefore enable video to be captured and broadcast to remote users and, depending on a viewer's authentication privileges or trustworthiness, certain private or protected information in the environment may be selectively displayed or obscured in the viewed video.

One or more embodiments may also enable the implementation of privacy zones or areas within an environment for use in augmented reality systems/methods.

Furthermore, many different ways to process a video stream and/or to identify and track an entity in a video stream may be employed in one or more embodiments.

The entity information may include at least one of: entity location information representative of a location of the protected entity; entity orientation information representative of an orientation of the protected entity; entity geometric information representative of at least one geometric property of the protected entity; entity color information representative of at least one color of the protected entity; entity 3D coordinate information representative of a position of the protected entity in a 3D coordinate space; content location information representative of a location of the protected content relative to the protected entity; content orientation information representative of an orientation of the protected content; and content geometric information representative of at least one geometric property of the protected content. Thus, the protected object or entity in an environment may be described using a wide variety of information which enables a high degree of flexibility or accuracy in determining the presence of the protected object/entity in a video recording of the environment.

One or more embodiments may further include: generating identified entity information relating to at least one property of the identified entity, and wherein the determining whether the entity is to be censored may further be based on the generated identified entity information. The identified entity information may include at least one of: viewing direction information representative of a viewing direction of a video capture device adapted to capture the video recording; viewing position information representative of a position of the video capture device; identified entity location information representative of a location of the identified entity; identified entity orientation information representative of an orientation of the identified entity; identified entity geometric information representative of at least one geometric property of the identified entity; identified entity color information representative of at least one color of the identified entity; and identified entity 3D coordinate information representative of a position of the identified entity in a 3D coordinate space. Thus, an object or entity that is identified in an environment may be described using a wide variety of information which enables a high degree of flexibility or accuracy in determining the presence of the protected object/entity in a video of the environment.

The determining whether the identified entity is to be censored may include determining whether the identified entity substantially matches the protected entity, and; if it is determined that the identified entity substantially matches the protected entity, then determining that the identified entity is to be censored. One or more embodiments may therefore enable the concept of censoring not only items that are predefined to be protected, but also to censoring items that are substantially the same as a protected entity (e.g. having at least one substantially matching property. For instance, a single painting may be defined as being a protected work of art and all other paintings of the same shape or size in the environment (e.g. art gallery) may be treated as being protected and thus censored from a video recording. In this way, one or more embodiments may provide a great deal of flexibility when enabling the definition of what is protected in an environment. Complex and/or time consuming interaction with a video capture system in order to specify protected items/objects in the environment may therefore be avoided.

In certain embodiments, the modifying the video stream may include: determining a portion of the entity to be censored based on entity information of the received VLC signal; and modifying the video recording to replace the portion of the entity to be censored with a graphical element adapted to obscure the portion of the identified entity in the video. By way of example, modifying the video stream may include generating the graphical element such that it is representative of a simplified 3D model of the identified entity. For instance, identified entities may be replaced by simple 3D models, such as cubes or boxes that obfuscate details of the entities. Such models may have flat surfaces of a single opaque color in order to mask or hide details of the entities being censored (e.g. hidden or obscured from view in the video). In other embodiments, the graphical element may include a masked or blurred version of the portion of the identified entity. Entities that are identified to be protected may thus be blurred or masked from view using simple graphic processing/rendering techniques that may be implemented in real-time and/or with little processing/rendering overhead.

In one or more embodiments, the determining whether the identified entity is to be censored may include: determining a viewing privilege or access right of a creator of the video recording; and determining the identified entity is to be censored based on the viewing privilege or access right of the creator not meeting a predetermined requirement. In this way, the display of protected content or information in a videoed environment may be controlled so that only trusted parties are able to see the protected items/information in a video of the environment. Conversely, untrusted parties (e.g. unidentified public viewers or unknown $3^{rd}$-parties) would only be able to view modified (e.g. censored) video wherein the private/confidential items are rendered (for example, using replacement graphical elements or effect) so that they are obscured from view.

The modified video stream may be displayed to a person remotely located from the environment. For example, one or more embodiments may be adapted to generate the modified (e.g. censored) video stream before communicating or broadcast the modified video to one or more $3^{rd}$-party viewers. Conversely, the captured video may first be communicated or broadcast to one or more video playback devices, wherein the video playback device(s) modify the received video in accordance with proposed embodiments so that a modified (e.g. censored) version of video stream is displayed to an untrusted viewer.

One or more embodiments may further include: transmitting a VLC signal comprising entity information relating to at least one property of the protected entity or protected content. Further, one or more embodiments may include: receiving a user input describing protected entity or protected content; and generating the entity information of the VLC signal based on the received user input. Such embodiments may therefore enable a user to tag items, objects, regions or entities within the environment that they wish to protect (e.g. censor). The user input information may then be used to generate information and rules about the protected object, regions or entities, thereby enabling their identification and censorship in a video stream of the environment. This may provide a high degree of flexibility and also accommodate changes in the environment.

According to another aspect of the present invention, there is provided a computer program product for censoring a video recording of an environment, the environment containing a protected entity displaying protected content to be censored, the computer program product including a computer readable storage medium having program instructions embodied therewith, the program instructions being executable by a processing unit to cause the processing unit to perform a method including: receiving a visual light communication, VLC, signal comprising entity information relating to at least one property of the protected entity or protected content; processing the video recording in accordance with an entity recognition algorithm to identify the presence of at least part of an entity in the environment; determining whether the identified entity is to be censored based on entity information of the received VLC signal; and, based on the identified entity being determined to be censored, modifying the video recording to replace at least a portion of the identified entity with a graphical element adapted to obscure the portion of the identified entity in the video.

According to a further aspect of the present invention, a censoring system is provided for censoring a video recording of an environment, the environment including a protected entity displaying protected content to be censored. The system includes a memory, and a processing unit communicatively coupled to the memory, wherein the system performs a method, including: receiving a visual light communication, VLC, signal including entity information relating to at least one property of the protected entity or protected content; processing the video recording in accordance with an entity recognition process to identify the presence of at least part of an entity in the environment; determining whether the identified entity is to be censored based on entity information of the received VLC signal; and based on the identified entity being determined to be censored, modifying the video recording to replace at least a portion of the identified entity with a graphical element adapted to obscure the portion of the identified entity in the video.

BRIEF DESCRIPTION OF THE DRAWINGS

Embodiments of the present invention are described below, by way of example only, with reference to the drawings, in which:

FIG. 5B depicts one censor embodiment which employs graphical elements or effects to obscure protected content of first and second picture frames, in accordance with one or more aspects of the present invention;

FIG. 6 depicts one embodiment of a computer-implemented method, in accordance with one or more aspects of the present invention.

DETAILED DESCRIPTION

Figure 1:
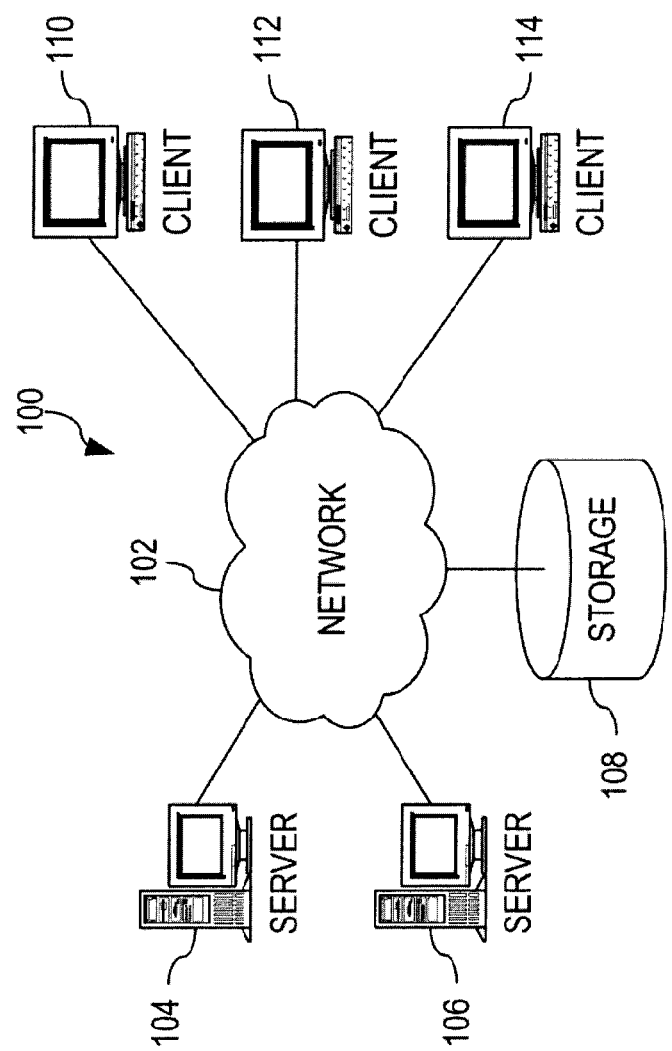
FIG. 1 depicts one embodiment of a distributed system in which one or more aspects of the present invention may be implemented.

It should be understood that the FIGS. are merely schematic and are not drawn to scale. It should also be understood that the same reference numerals are used throughout the FIGS. to indicate the same or similar parts.

Disclosed herein is a process, system, and computer program product for hiding private, protected or confidential information in a video recording of an environment containing the private, protected or confidential information. In this way, the video recording of the environment may be censored so that it can be viewed by an untrusted $3^{rd}$-party while maintaining the privacy, confidentiality or protected nature of the information in the video.

By employing VLC to identify protected content in the vicinity of a recording taking place, the protected content may be blocked from being viewable in the recording recorded. For example, a VLC signal may be employed so as to enable protected objects or entities to be defined in an environment. Using information from the VLC signal, a video recording of the environment may then be processed (e.g. in real-time) to determine if the video recording contains content to be censored (such as the protected object itself or content having a predetermined relationship with the protected object). Embodiments may therefore enable a user to capture and share a live video stream of an environment (such as a room, enclosed space, commercial or residential building, or personal dwelling) while ensuring that private, confidential or copyright-protected information will be censored from the view in the video (which may be seen by an untrusted or unauthorized $3^{rd}$ party for example).

Use of VLC may provide the benefit of avoiding a need to have to 'pair' devices and/or install and set up software. Also, as information may be sent through the visible portion of the electromagnetic spectrum using a VLC signal, communication of the information may be limited to VLC receivers in the line of sight of the VLC signal, unlike radio waves used in Bluetooth or Wi-Fi which can pass through walls and leak into other rooms. Further, various light-emitting devices may be used as a VLC transmitter, including LED light bulbs and the pixels of a screen. This means that existing displays (e.g. laptop screens, cinema screens and mobile phone screens) may be employed to implement censoring concepts according to proposed embodiments.

Furthermore, one or more embodiments may enable real-time censoring of a live video-stream provided to a public audience, wherein the public audience is prevented from seeing particular items (such as copyright-protected content for example) in the displayed video-stream.

For instance, one or more embodiments may enable live video to be captured and broadcast to remote users and, depending on a viewer's authentication privileges or trust-worthiness, certain content in the environment may be selectively displayed or obscured in the viewed video.

Illustrative embodiments may therefore provide for protected zones or areas within an environment used in an augmented reality system/method.

Such aspects may also provide for the generation of a censored video stream in an automated manner. Any video processing system could be used with the inventive aspects disclosed herein, but it may be desirable for such a system to exhibit at least one of the following qualities: augmented reality processing capabilities; 3D spatial tracking capabilities; entity recognition; virtual reality capabilities; video capture abilities; and video communication abilities.

Modifications and additional steps to a traditional video capture and transmission system are also disclosed which may enhance the value and utility of the proposed concepts.

Reference to a protected entity may be taken to refer to any object, entity, area, surface, or item that may contain or display information that may be protected, confidential or sensitive in nature, such as text, images, alphanumeric characters, logos, names, documents, files, shapes, keys, codes, passwords, dates, locations, etc.

Figure 2:
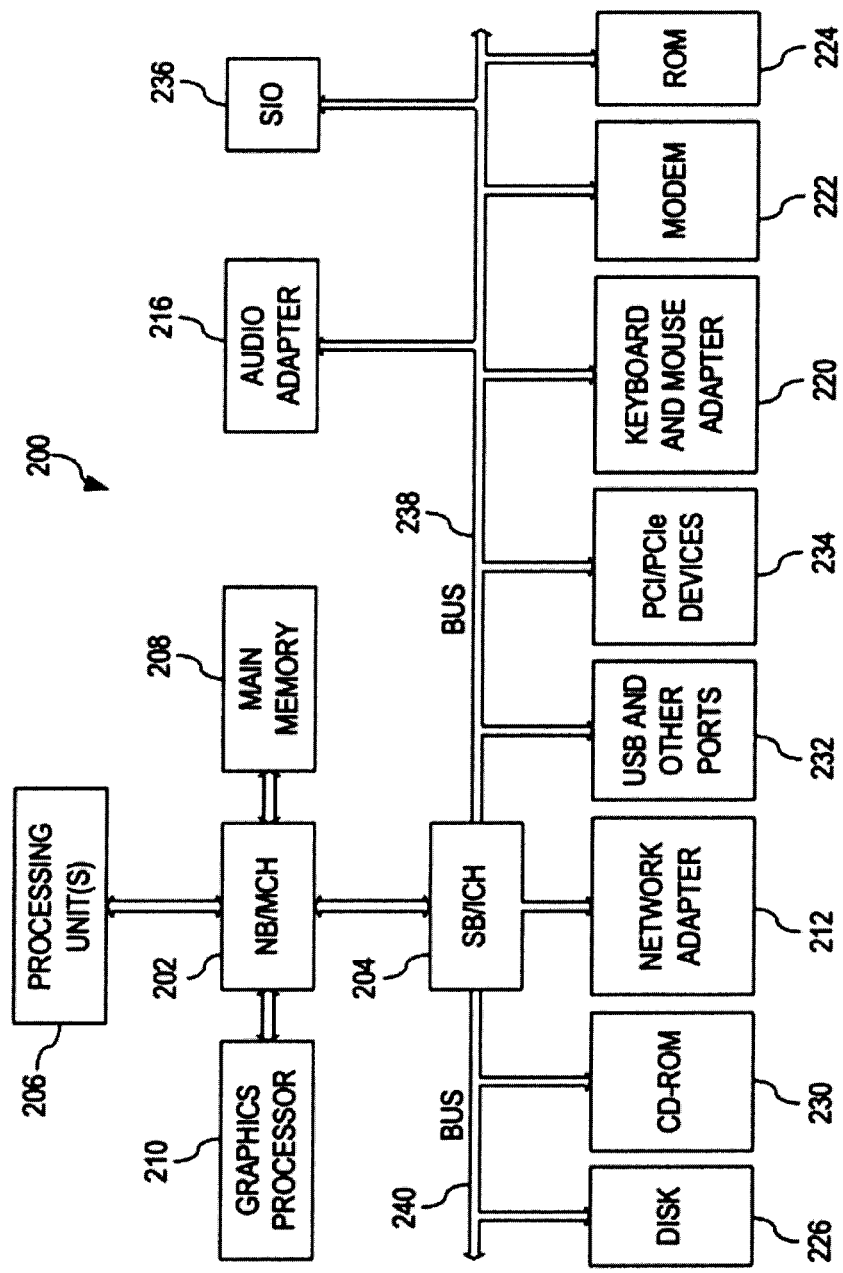
FIG. 2 is a block diagram of one embodiment of a video processing system in which one or more aspects of the present invention may be implemented.

Illustrative embodiments may be utilized in many different types of data or video processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, smartphones, video capture devices, digital imaging devices, portable cameras, Oculus Rift® devices, VR devices, or the like. In the depicted example, the first server 104 provides data, such as boot files, operating system images, and applications to the clients 110, 112, and 114. Clients 110, 112, and 114 are clients to the first server 104 in the depicted example. The distributed prediction system 100 may include additional servers, clients, and other devices not shown.

In the depicted example, the distributed system 100 may be the Internet, with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a portable computing device, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. Similarly, one or data structures according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as 3D spatial tracking devices, video capture devices, positioning systems, accelerometer arrangement, equivalent non-volatile memory, or optical disk drives and the like, may be used in addition to or in place of the hardware depicted in FIGS. 1 and 2. Also, the processes of the illustrative embodiments may be applied to a multiprocessor data or video processing system, other than the system mentioned previously, without departing from the scope of the proposed embodiments.

Moreover, the system 200 may take the form of any of a number of different data or video processing systems including client computing devices, server computing devices, a tablet computer, laptop computer, smart (e.g. internet-enabled) television or display, smartphone or other communication device, a digital image/video capture device (e.g. DSLR camera), a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

One or more aspects of the present invention may enhance a video capture or display system by providing for automatic and dynamic censoring of a video recording. One or more embodiments may employ a VLC signal to enable private, confidential or copyright-protected information in a videoed environment to be censored from view in the captured video. Such VLC signal-based censoring features can be applied to live video streams thus enabling real-time censoring of live video broadcast, and, in some embodiments, such censoring may be adapted according to individual viewers of the video stream.

Figure 3:
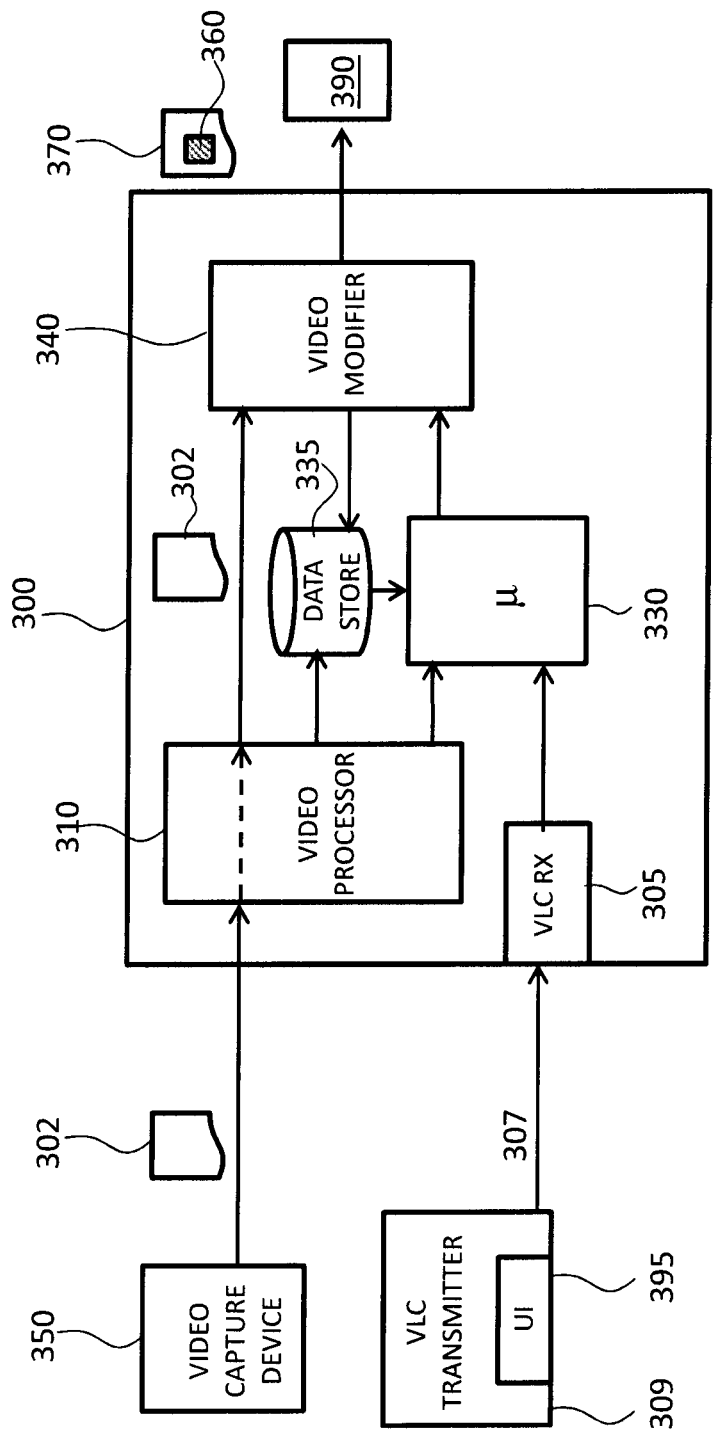
FIG. 3 is a simplified block diagram of one embodiment of a censor system, in accordance with one or more aspects of the present invention.

FIG. 3 is a simplified block diagram of an example censoring system 300 according to a proposed embodiment. The censoring system 300 is adapted to provide for censoring of a video 302 of an environment, wherein the environment contains a protected entity displaying protected content to be censored (e.g. obscured, hidden, or concealed) from view within the video.

The system 300 includes a VLC signal receiver 305 and a video processing unit 310. The system 300 also comprises a data processing unit 330, a data store 335 and a video modification unit 340.

The VLC signal receiver 305 is adapted to receive a VLC signal 307 (transmitted by a VLC transmitter 309, for example) comprising entity information relating to at least one property of a protected entity or protected content.

The entity information provided by a VLC signal can be used to determine if an entity identified in a video recording of the environment is to be censored, and then to modify the video recording to replace (at least a portion of) the identified entity with a graphical element which obscures (at least a portion of) the identified entity so as to prevent the display of identified entity and/or the sensitive/private/copyright-protected information it may display. Thus, by employing various types of information relating to the protected entity, for example, changes in the environment and/or the protected entity may be catered for.

By way of example, the private entity information may include at least one of: entity location information representative of a location of the protected entity; entity orientation information representative of an orientation of the protected entity; entity geometric information representative of at least one geometric property of the protected entity; entity color information representative of at least one color of the protected entity; entity 3D coordinate information representative of a position of the protected entity in a 3D coordinate space; content location information representative of a location of the protected content relative to the protected entity; content orientation information representative of an orientation of the protected content; and content geometric information representative of at least one geometric property of the protected content. Thus, the protected object or entity in the environment may be described using a wide variety of information which enables a high degree of flexibility or accuracy in determining the presence of the protected object/entity in a video recording of the environment.

The video processing unit 310 may be adapted to process a video stream 302 of the environment (received from a video capture device 350, for example) in accordance with an entity recognition process to identify the presence of at least part of an entity or protected content in the environment. In this regard, it is noted that there already exist many different ways to identify and track an entity in a video stream may be employed by embodiments, some of which are already widely known and employed in video capture, virtual reality and augmented reality systems. Accordingly, detailed description of such methods for identifying and tracking entities (such as object, items, persons, areas) in the received video stream is omitted from the description. However, purely by way of example, entity recognition processes that may be employed by the video processing unit 310 include: color matching algorithms, phase detection algorithms, edge detection algorithms, contrast detection algorithms, face recognition algorithms, 3D spatial tracking algorithms such as those provided by Hololens' raw data. Other known products and software may also be employed, such as the Microsoft™ Kinect™ and the Leap Motion™. Other such algorithms and products include "Sync 3D", "Asus Xtion Pro", algorithms in edge detection, or algorithms for 3D object detection in 2D video.

By way of example, the video processing unit 310 may be adapted to generate identified entity information relating to at least one property of the identified entity. By way of example, such identified entity information may include the following information: viewing direction information representative of a viewing direction of a video capture device 350; viewing position information representative of a position of the video capture device 350; identified entity location information representative of a location of the identified entity; identified entity orientation information representative of an orientation of the identified entity; identified entity geometric information representative of at least one geometric property of the identified entity; identified entity color information representative of at least one color of the identified entity; and identified entity 3D coordinate information representative of a position of the identified entity in a 3D coordinate space. Thus, the video processing unit 310 may enable an object or entity that is identified in an environment by the video processing unit 310 to be described using a wide variety of information, thereby enabling a high degree of flexibility or accuracy in analyzing the identified entity against predetermined constraints, measures, validation parameters, etc.

The video processing unit 310 may provide the generated identified entity information to the data processing unit 330. The video processing unit 310 may also provide the generated identified entity information to a data storage unit 335.

The data processing unit 330 is adapted to determine if the identified entity is to be censored from the video or not. To make this determination, the data processing unit may use the entity information relating to the private entity (provided in the received VLC signal) and the generated identified entity information (provided directly from the video processing unit 310 and/or stored in the data store 335).

By way of example, the data processing unit 330 may be adapted to determine if the identified entity is to be censored by assessing if the identified entity substantially matches the protected entity. The assessment may, for example, comprise comparing the entity information and the generated identified entity information to identify matches in parameter values or properties of the identified entity and protected entity. Also, differences in values may be compared against predetermined constraints, measures, threshold values, validation parameters, etc.

If the data processing unit 330 determines that the identified entity substantially matches the protected entity, it may be concluded by the data processing unit 330 that the identified entity is to be censored. The data processing unit 330 may then provide information about its conclusion(s) (e.g. the result(s) of its analysis of the identified entity information and entity information) to the video modification unit 340.

The video modification unit 340 may also be adapted to receive the video 302. For example, the video processing unit 310 may pass the video 302 (unmodified) on to the video modification unit 340. Thus, the processing undertaken by the video processing unit 310 may not modify the actual content of the video 302, but instead may extract information from the video 302.

If the identified entity is determined to be censored, the video modification unit 340 may modify the video stream 302 to replace at least a portion of the identified entity with a graphical element 360 which obscures the portion of the identified entity in the video stream. In this way, the video modification unit 340 is adapted provides a modified (e.g. censored) video 370. The video modification unit 340 may then output the modified video 370 for display to an unknown or un-trusted viewer (via a display unit 390 for example).

Also, the video modification unit 340 may provide the modified video 370 to the data store 335 for storage. In this way, the embodiment, may be adapted to only store modified video 370 wherein protected content has been censored. By only storing modified (e.g. censored) video, a malicious user may be prevented from accessing un-modified (e.g. uncensored) video by accessing the data store for example.

Thus, it will be understood that the system 300 of FIG. 3 may automatically and dynamically censor a video recording of an environment containing protected content. It is also noted that, by leveraging a VLC signal comprising pre-defined information about content to be censored along with information generated from the video recording 302, the system 300 may process and modify the video stream 302 in real time, so as to provide a modified (e.g. censored) real-time (e.g. live) video stream 370 wherein protected content of environment which are present in the video stream 305 is replaced or obscured by a graphical element or graphical effect 360, thereby preventing a viewer of the modified video recording 370 from viewing the protected content. By processing each frame of the video stream 370, the system may track the position of protected content in a video recording so that it remains blurred or masked at all times that it is within the video's view.

The modified video stream 370 may therefore be communicated (e.g. sent, or broadcast) in a live manner to remote viewers without compromising (e.g. exposing or making visible/viewable) private or confidential content in the videoed environment.

It is noted that the VLC transmitter 309 of the embodiment of FIG. 3 also includes a user input interface 395 which is adapted to receive a user input describing protected content to be censored. Such user inputs may, for example, be provided to the VLC transmitter 309 for subsequent use in generating entity information of a VLC signal. User inputs may thus be provided to the VLC transmitter 309, which then generates a VLC signal based on the received user inputs (for example, in an appropriate format for transmission). A user may therefore define (e.g. tag, describe, label, etc.) objects, regions or protected entities and/or within the environment that are to be censored in a video of the environment.

Thus, inputs from a user may be used to generate information and rules about such user-defined regions or entities, thereby enabling their identification and censorship in a video recording of the environment. This may enable users to identify protected content in a quick and simple manner. One or more embodiments of the present invention may therefore enable a high degree of flexibility and ease of use for a user.

One or more aspects of the system 300 of FIG. 3 may be integrated into a video capture system, and thus may be employed within virtual reality systems and/or augmented reality systems, such as Hololens®, virtual reality headsets, head-mounted display systems, Oculus Rift® systems, and the like. For instance, such systems may be adapted to capture a video of an environment containing protected content and then censor the video (e.g. by obscuring a portion of the video that would otherwise display the protected content) prior to displaying the video to an external viewer.

However, it is to be understood that embodiments may be employed in video display systems that are adapted to display video captured of an environment. Such video may be captured using a conventional image or video capture device and this may then be supplemented using a proposed system like that of FIG. 3 so as to process the video and modify it to censor private/confidential/copyright-protected information from the video before it is stored or displayed to a viewer. In this way, embodiments may be implemented at a location that is different or remote from the videoed environment.

One or more embodiments may also be distributed at various positions throughout a video capture and display system, rather than being located at the video capture end or the video display end for example. Taking such an approach may enable processing and/or hardware requirements to be distributed according to requirements, thus potentially reducing cost complexity, and/or resource implications where desired.

Turning now to FIG. 4, there is depicted an example of how one embodiment of the present invention may censor protected content displayed by a television device. More specifically, in this example, a television device 400 in a room (not visible) is predefined a displaying protected content. A predefined rule is defined in the embodiment that any content/information displayed by the television device is to be considered protected and thus should be censored. Information relating to at least one property of the television device 400 and/or protected content is provided in a VLC signal which is transmitted by a VLC transmitter 405 integrated within the television device 400.

Figure 4C:
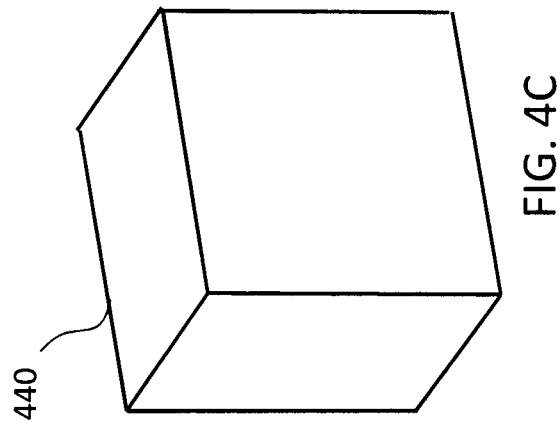
FIGS. 4A-4C depict an illustration of how protected content displayed by an object may be censored, in accordance with one or more aspects of the present invention.
Figure 4B:
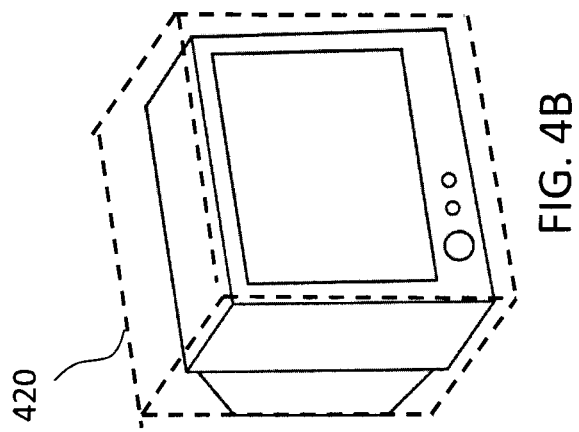
Figure 4A:
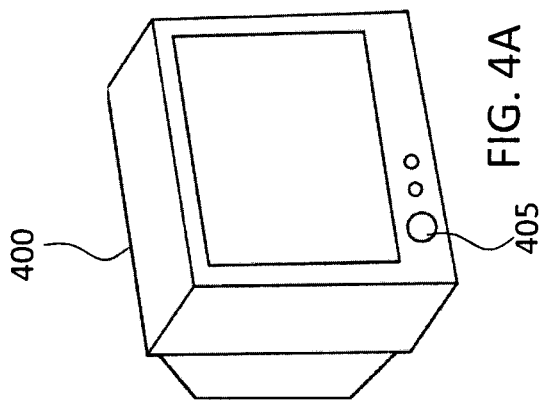

FIG. 4A depicts a frame from a captured video of the room wherein only the television device 400 is shown. As illustrated in FIG. 4B, the boundary edges 420 of the television device 400 are identified by a 3D edge detection algorithm.

Based on a VLC signal received from the VLC transmitter 405 and the identified boundary edges 420, an embodiment determines that the boundary edge 420 of the television device 400 matches that which is expected for the television device 400, and thus determines the protected entity (i.e. the television device 400) is present in the video frame, along with its location, orientation, size, shape, etc. values.

Based on the identified boundary edges 420, graphical elements representing a simplified 3D model of the identified object are then generated and used to replace the television device 400 in the video, as illustrated in FIG. 4C. Thus, the television device 400 is replaced by a simple 3D model 440 in the video. This simplified 3D model 440 obfuscates the shape and/or details of the television device 400 and any protected content it may display. In some embodiments, simplified models may have differing visual characteristics so that they may be distinguished from each other in a modified video stream.

Figure 5A:
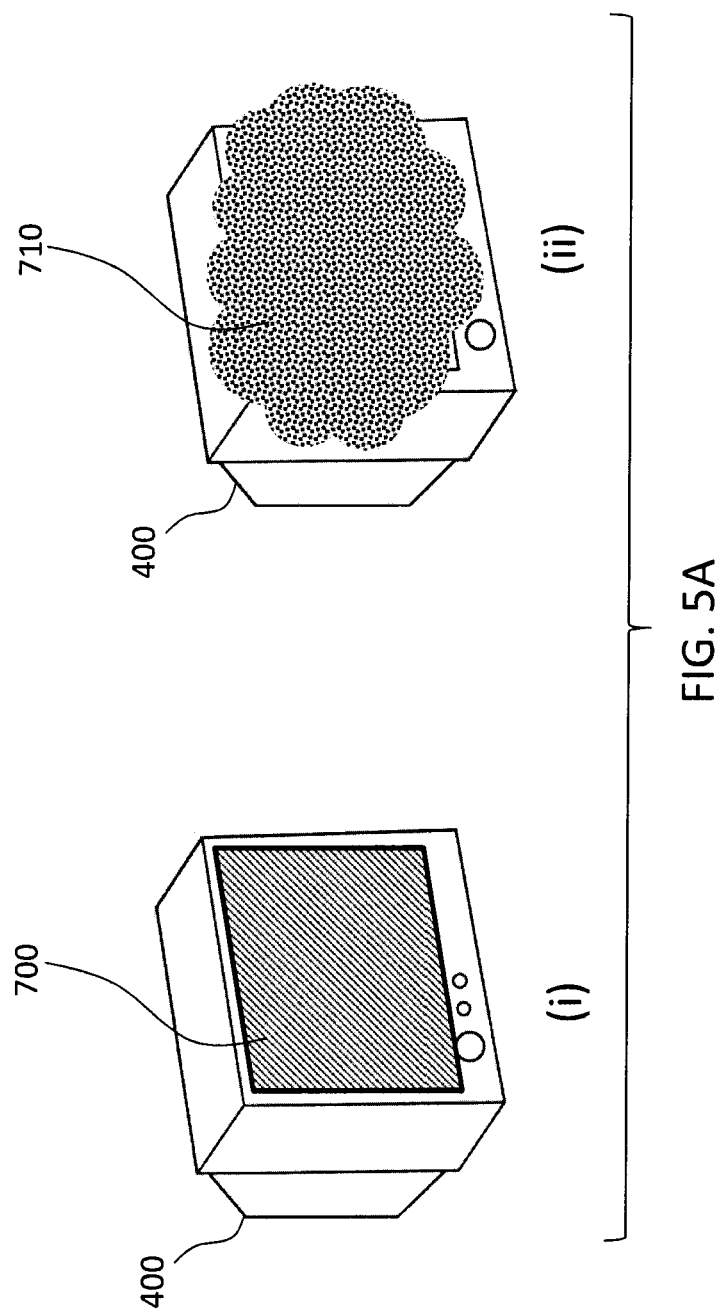
FIG. 5A depicts further illustrations of how protected content may be obscured in a video, in accordance with one or more aspects of the present invention.

Referring now to FIG. 5A, it is illustrated that embodiments may employ other graphical elements or effects to obscure private entities in a video.

For example, the left diagram (labeled "(i)") of FIG. 5A demonstrates how the graphical element may include a mask 700 that covers a portion of the protected entity (e.g. the television device 400). The mask may, for example, comprise flat or smoothed surfaces which is matt or opaque in color so as to mask or hide details in the modified video.

The right diagram (labeled "(ii)") of FIG. 5A, on the other hand, demonstrates how the graphical element may comprise a blur effect 710 that blurs an object (e.g. the display of television device 400) positioned on top of the private entity (e.g. the television device 400).

Referring now to FIG. 5B, it is illustrated how an embodiment may employ graphical elements or effects to obscure protected content of two differently shaped picture frames.

More specifically, in this example, a first picture frame 520 in a room is predefined as displaying protected content. A predefined rule is defined in the embodiment that any content/information displayed in the first picture frame 520 is to be considered protected and thus should be censored. Information relating to at least one property of the first picture frame 520 (e.g. its shape, size and orientation) and/or protected content is provided in a VLC signal 535 which is transmitted by a VLC transmitter 530 situated between the first 520 and second 540 picture frames.

Further, the second picture frame 540 in the room is also predefined as displaying protected content. A predefined rule is defined in the embodiment that any content/information displayed in the second picture frame 540 is to be considered protected and thus should be censored. Information relating to at least one property of the second picture frame 540 (e.g. its shape, size and orientation) and/or protected content is provided in the VLC signal 535 transmitted by the VLC transmitter 530.

As illustrated in FIG. 5B, the first 520 and second 540 picture frames are identified by a shape detection algorithm. Based on the VLC signal 535 received from the VLC transmitter 530 and the identified shapes of the first 520 and second 540 picture frames, the depicted embodiment determines that the shape of the first picture frame 520 matches that which is expected for the first picture frame 520, and thus determines the first picture frame 520 is present in the video recording, along with its location, orientation, size, shape, etc. values.

Based on the identified shape, location and orientation of the first picture frame 520, a graphical element 550 is generated to cover a portion of the first picture frame 520. In this example, the graphical element 550 comprises a mask which may, for example, be opaque in color so as to mask or hide details in the modified video, as illustrated in FIG. 5B. This graphical element 550 obfuscates details of any protected content that may be displayed within the first picture frame 520.

Further, based on the VLC signal 535 received from the VLC transmitter 530 and the identified shapes of the first 520 and second 540 picture frames, the depicted embodiment determines that the shape of the second picture frame 540 matches that which is expected for the second picture frame 540, and thus determines the second picture frame 540 is present in the video recording, along with its location, orientation, size, shape, etc. values.

Based on the identified shape, location and orientation of the second picture frame 540, a graphical element 560 is generated to cover a portion of the second picture frame 540. In this example, the graphical element 570 comprises a blurred or scrambled graphical effect which may hide details in the modified video, as illustrated in FIG. 5B. This graphical element 570 obfuscates details of any protected content that may be displayed within the second picture frame 540.

Thus, the depicted example, of FIG. 5B employs a single VLC transmitter to censor multiple protected entities or instances of protected content. It may also censor the video so that the graphical elements may have differing visual characteristics in order to distinguish protected items/content from each other in a modified video recording.

Turning now to FIG. 6, an exemplary implementation of a computer-implemented method 600 according to one or more aspects of the present invention is presented. The method may enable censoring of a video recording of an environment containing a protected entity displaying content be censored.

The method may include: receiving 620 a video stream of the environment; and receiving 630 a VLC signal comprising entity information relating to at least one property of the protected entity or protected content. A portion (e.g. a frame, a section of a frame, multiple sequential frames, etc.) of the received video is then processed in step 640. More specifically, the received video may be processed in accordance with an entity recognition process to identify the presence of at least part of an entity in the environment.

In step 650, it is determined if the identified entity is to be censored based on based on entity information of the received VLC signal. By way of example, step 650 of determining whether the identified entity is to be censored may include determining whether the identified entity is currently adapted to display protected content. If it is determined that the identified entity currently adapted to display protected content, then the result of step 650 is that the identified entity it determined to be censored.

The result of the determination is then analyzed (in step 660) to decide whether or not to proceed to step 670. If the identified entity is determined in step 650 not to be censored, the method returns to step 640 wherein a next portion of the video is processed.

If, on the other hand, the identified entity is determined in step 650 to be censored, the method proceeds to step 670 wherein the video stream is modified to replace at least a portion of the identified entity with a graphical element adapted to obscure the portion of the identified entity in the video. The graphical element used may, however, also depend on other considerations or entity information. In this way, differing graphical elements may be used to obscure, hide, or cover differing entities in the video recording for example.

A practical example of one embodiment for use in video censoring may include a live video stream of an office being broadcast to multiple viewing locations, wherein an embodiment would employ a VLC signal to provide information about protected content in the office. Based on information provided by a received VLC signal received, the embodiment may apply blurs and/or masks in real-time (in a similar fashion to other augmented reality systems) so as to render protected content imperceptible in the final (e.g. broadcast) video.

In another practical example, a user may tour an environment while using a system according to an embodiment of the present invention, and define objects or areas in the 3D space that they do not wish unauthorized viewers to see. The system would then generate protected entity information and rules from such user inputs, which can then be included in a VLC signal provided by a VLC transmitter positioned in the environment. During a recording or live broadcast, items in the view of the video would be identified, tracked, and analyzed in conjunction with information provided by the VLC signal. Where any of the items are determined to display protected content for example, a simplified 3D model (such as a colored cuboid) is rendered to cover the item in the video so that then item (and/or the content it displays) is obscured from view. Information used to scan and track the video may, for example, relate to global positioning information, local positioning information, room/environment plans, 3D map/models of the environment and/or objects, etc.

In yet another example, one may consider a situation where there is a television in the room of a family house. On the television, there may be a film being displayed, which is protected by copyright laws and should not be recorded. A user may be recording their child playing next to the television with an AR device. As the film is being displayed, a VLC transmitter associated with the television may transmit a VLC signal to the AR device which signifies that content being displayed by the television is protected (e.g. copyrighted). Based on the information provided by the received VLC signal, as well as details about the specific model of the television (such as shape, size, etc.), the AR device may analyze the view and use image processing aided by the information about the television to identify the presence of the television within a view displayed by the AR device. The AR device may then overlay a mask/block over the television before rendering and/or storing the video. In this way, the AR system does not interfere with the user's experience whilst also protecting the copyrighted material from being depicted in the recorded/stored video.

Those skilled in the art will note from the above description that provided herein, in one or more aspects, is a censoring system for censoring a video recording of an environment, the environment containing a protected entity displaying protected content to be censored, the system including: a VLC signal receiver adapted to receive a VLC signal comprising entity information relating to at least one property of the protected entity or protected content; a video processing unit adapted to process the video recording in accordance with an entity recognition algorithm to identify the presence of at least part of an entity in the environment; a processing unit adapted to determine if the identified entity is to be censored based on entity information of the received VLC signal; and a video modification unit adapted to, if the identified entity is determined to be censored, modify the video recording to replace at least a portion of the identified entity with a graphical element adapted to obscure the portion of the identified entity in the video.

A system is disclosed which can automatically and dynamically censor a video recording of an environment containing protected content (e.g. private, sensitive or copyright-protected information). The system may, for example, process a video stream and modify the video stream, in real time, so as to provide a modified (e.g. censored) video stream wherein protected entities or content of the environment which are present in the video stream are replaced or obscured by graphical element or effect, thereby preventing a viewer of the modified video stream from viewing the confidential information. For example, the system may track the position of a protected object or entity in a video recording so that it remains blurred or masked at all times that it is within the video's view. A proposed embodiment of a system may therefore use information from a received VLC signal to censor a video stream in real-time so as to avoid unnecessary time delays caused by extensive and/or conventional post-processing of the video stream prior to be transmitted or broadcast.

The video modification unit may be adapted to: determine a portion of the entity to be censored based on entity information of the received VLC signal, and to modify the video recording to replace the portion of the entity to be censored with a graphical element adapted to obscure the portion of the identified entity in the video. For instance, the video modification unit may be adapted to generate the graphical element such that it is representative of a simplified 3D model of the identified entity. Identified entities may be replaced by simple 3D models, such as cubes, prisms or boxes that obfuscate the shape and/or details of the entities. The simplified models may have flat or smoothed surfaces and may be matt or opaque in color so as to mask or hide details in the modified video.

The graphical element may include a masked or blurred version of the portion of the identified entity. Simple graphic or video processing and rendering techniques may therefore be used in order to censor private objects/items in a modified video according to an embodiment.

One or more embodiments may be employed in video capture systems, and may be of particular use in virtual reality systems and/or augmented reality systems, such as Hololens®, virtual reality headsets, head-mounted display systems, Oculus Rift® systems, and the like. For instance, such systems may be adapted to capture a video of an environment containing protected object(s) and/or protected content and then censor the video (e.g. by obscuring a portion of the video that would otherwise display the private object/content) prior to displaying the video to a viewer.

According to one or more other aspects of the present invention, a censoring arrangement is provided for censoring a video recording of an environment, the environment containing a protected entity displaying protected content to be censored, the arrangement including: a censorship identification device according to a proposed embodiment; and a censorship system according to a proposed embodiment.

One or more embodiments may also be employed in video display systems that are adapted to display video captured of an environment. Such video may be captured using a conventional image or video capture device and this may then be supplemented using a device, system or method according to an embodiment so as to process the captured video and modify it (based on information provided by a received VLC signal) to censor protected content from the video before it is displayed to a viewer. Thus, embodiments may be implemented at a location that is different or remote from the videoed environment, such as in a video processing system and/or video display system of a viewer.

According to another aspect of the present invention, there is provided a censorship identification device for identifying a protected entity displaying protected content to be censored, the device comprising: a visual light communication, VLC, signal transmitter adapted to a VLC signal comprising entity information relating to at least one property of the protected entity or protected content. The device may, for example, be adapted to be coupled to, or integrated with, the protected entity.

Figure 7:
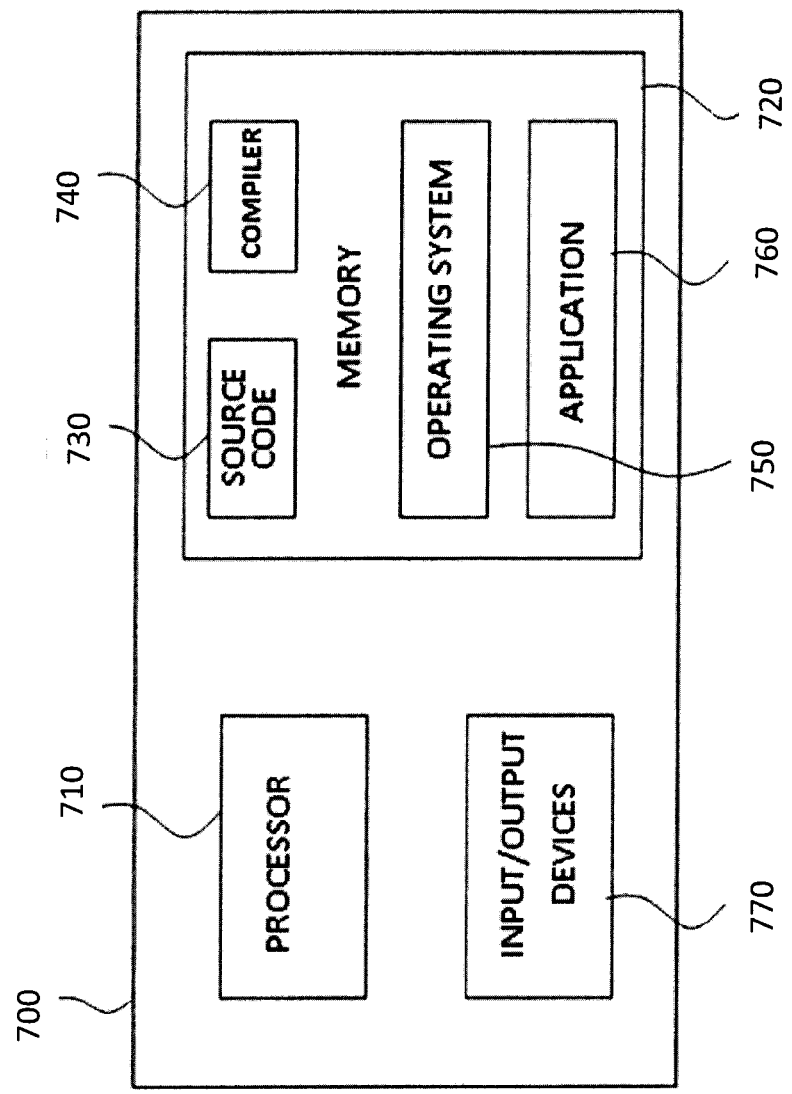
FIG. 7 illustrates an example of a computer device within which one or more aspects of the present invention may be employed.

FIG. 7 illustrates an example of a computer 700 within which one or more aspects of the present invention may be employed. Various operations discussed above may utilize the capabilities of the computer 700. For example, one or more parts of a system for censoring video may be incorporated in any element, module, application, and/or component discussed herein.

The computer 700 includes, but is not limited to, PCs, workstations, laptops, PDAs, palm devices, smartphones, image capture devices, video capture devices, internet-enabled displays, servers, storages, and the like. Generally, in terms of hardware architecture, the computer 700 may include one or more processors 710, memory 720, and one or more I/O devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 may be a hardware device for executing software that can be stored in the memory 720. The processor 710 can be virtually any custom made or commercially available processor, a central processing unit (CPU), a digital signal processor (DSP), or an auxiliary processor among several processors associated with the computer 700, and the processor 710 may be a semiconductor based microprocessor (in the form of a microchip) or a microprocessor.

The memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the memory 720 may include one or more separate programs, each of which comprises an ordered listing of executable instructions for implementing logical functions. The software in the memory 720 includes a suitable operating system (O/S) 750, compiler 740, source code 730, and one or more applications 760 in accordance with exemplary embodiments. As illustrated, the application 760 comprises numerous functional components for implementing the features and operations of the exemplary embodiments. The application 760 of the computer 700 may represent various applications, computational units, logic, functional units, processes, operations, virtual entities, and/or modules in accordance with exemplary embodiments, but the application 760 is not meant to be a limitation.

The operating system 750 controls the execution of other computer programs, and provides scheduling, input-output control, file and data management, memory management, and communication control and related services. It is contemplated by the inventors that the application 760 for implementing exemplary embodiments may be applicable on all commercially available operating systems.

Application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. The I/O devices 770 may include input devices such as, for example but not limited to, a mouse, keyboard, scanner, microphone, camera, etc. Furthermore, the I/O devices 770 may also include output devices, for example but not limited to a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or intranet.

If the computer 700 is a PC, workstation, intelligent device or the like, the software in the memory 720 may further include a basic input output system (BIOS) (omitted for simplicity). The BIOS is a set of essential software routines that initialize and test hardware at startup, start the O/S 750, and support the transfer of data among the hardware devices. The BIOS is stored in some type of read-only-memory, such as ROM, PROM, EPROM, EEPROM or the like, so that the BIOS can be executed when the computer 700 is activated.

When the computer 700 is in operation, the processor 710 may be configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 760 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of censoring a video recording of an environment, the environment containing a protected entity displaying protected content to be censored, the method comprising:
   receiving a visual light communication, VLC, signal comprising entity information relating to at least one property of the protected entity or protected content;
   processing the video recording in accordance with an entity recognition process to identify the presence of at least part of an entity in the environment;
   determining whether the identified entity is to be censored based on entity information of the received VLC signal; and
   based on the identified entity being determined to be censored, modifying the video recording to replace at least a portion of the identified entity with a graphical element adapted to obscure the portion of the identified entity in the video.

2. The method of claim 1, wherein the entity information comprises information selected from the group consisting of:
   entity location information representative of a location of the protected entity;
   entity orientation information representative of an orientation of the protected entity;
   entity geometric information representative of at least one geometric property of the protected entity;
   entity color information representative of at least one color of the protected entity;
   entity 3D coordinate information representative of a position of the protected entity in a 3D coordinate space;
   content location information representative of a location of the protected content relative to the protected entity;
   content orientation information representative of an orientation of the protected content; and
   content geometric information representative of at least one geometric property of the protected content.

3. The method of claim 1, further comprising generating identified entity information relating to at least one property of the identified entity, and wherein the determining whether the entity is to be censored is further based on the generated identified entity information.

4. The method of claim 3, wherein the identified entity information comprises information selected from the group consisting of:
   viewing direction information representative of a viewing direction of a video capture device adapted to capture the video recording;
   viewing position information representative of a position of the video capture device;
   identified entity location information representative of a location of the identified entity;
   identified entity orientation information representative of an orientation of the identified entity;
   identified entity geometric information representative of at least one geometric property of the identified entity;
   identified entity color information representative of at least one color of the identified entity; and
   identified entity 3D coordinate information representative of a position of the identified entity in a 3D coordinate space.

5. The method of claim 1, wherein the modifying the video stream comprises:
   determining a portion of the entity to be censored based on entity information of the received VLC signal; and
   modifying the video recording to replace the portion of the entity to be censored with a graphical element adapted to obscure the portion of the identified entity in the video.

6. The method of claim 1, wherein the determining whether the identified entity is to be censored comprises:
   determining whether the identified entity substantially matches the protected entity; and
   based on determining that the identified entity substantially matches the protected entity, determining the identified entity is to be censored.

7. The method of claim 1, further comprising transmitting a VLC signal comprising entity information relating to at least one property of the protected entity or protected content.

8. The method of claim 1, wherein the modifying the video stream comprises generating the graphical element such that the graphical element is representative of a simplified 3D model of the identified entity.

9. The method of claim 1, wherein the modifying the video stream comprises generating the graphical element such that the graphical element comprises a masked or blurred version of the portion of the identified entity.

10. The method of claim 1, wherein the determining if the identified entity is to be censored comprises:
    determining a viewing privilege or access right of a creator of the video recording; and
    determining the identified entity is to be censored based on the viewing privilege or access right of the creator not meeting a predetermined requirement.

11. The method of claim 1, further comprising displaying the modified video recording to a person remotely located from the environment.

12. A computer program product for censoring a video recording of an environment, the environment containing a protected entity displaying protected content to be censored, the computer program product comprising:
    a non-transitory computer readable storage medium having program instructions embodied therewith, the program instructions being executable by a processing unit to cause the processing unit to perform a method comprising:

receiving a visual light communication, VLC, signal comprising entity information relating to at least one property of the protected entity or protected content;

processing the video recording in accordance with an entity recognition algorithm to identify the presence of at least part of an entity in the environment;

determining whether the identified entity is to be censored based on entity information of the received VLC signal; and based on the identified entity being determined to be censored, modifying the video recording to replace at least a portion of the identified entity with a graphical element adapted to obscure the portion of the identified entity in the video.

13. A censoring system for censoring a video recording of an environment, the environment containing a protected entity displaying protected content to be censored, the system comprising:

a memory; and a processing unit communicatively coupled to the memory, wherein the system performs a method comprising:

receiving a visual light communication, VLC, signal comprising entity information relating to at least one property of the protected entity or protected content;

processing the video recording in accordance with an entity recognition process to identify the presence of at least part of an entity in the environment;

determining whether the identified entity is to be censored based on entity information of the received VLC signal; and based on the identified entity being determined to be censored, modifying the video recording to replace at least a portion of the identified entity with a graphical element adapted to obscure the portion of the identified entity in the video.

14. The system of claim 13, wherein the entity information comprises information selected from the group consisting of:

entity location information representative of a location of the protected entity;

entity orientation information representative of an orientation of the protected entity;

entity geometric information representative of at least one geometric property of the protected entity;

entity color information representative of at least one color of the protected entity;

entity 3D coordinate information representative of a position of the protected entity in a 3D coordinate space;

content location information representative of a location of the protected content relative to the protected entity;

content orientation information representative of an orientation of the protected content; and content geometric information representative of at least one geometric property of the protected content.

15. The system of claim 13, further comprising generating identified entity information relating to at least one property of the identified entity, and wherein the determining whether the entity is to be censored is further based on the generated identified entity information.

16. The system of claim 13, wherein the identified entity information comprises information selected from the group consisting of:

viewing direction information representative of a viewing direction of a video capture device adapted to capture the video recording;

viewing position information representative of a position of the video capture device;

identified entity location information representative of a location of the identified entity;

identified entity orientation information representative of an orientation of the identified entity;

identified entity geometric information representative of at least one geometric property of the identified entity;

identified entity color information representative of at least one color of the identified entity; and identified entity 3D coordinate information representative of a position of the identified entity in a 3D coordinate space.

17. The system of claim 13, wherein the determining whether the identified entity is to be censored comprises:

determining whether the identified entity substantially matches the protected entity; and based on determining that the identified entity substantially matches the protected entity, determining the identified entity is to be censored.

18. The system of claim 13, wherein the modifying the video stream comprises:

determining a portion of the entity to be censored based on entity information of the received VLC signal; and modifying the video recording to replace the portion of the entity to be censored with a graphical element adapted to obscure the portion of the identified entity in the video.

19. The system of claim 13, wherein the modifying the video stream comprises generating the graphical element such that the graphical element is representative of a simplified 3D model of the identified entity.

20. The system of claim 13, wherein the modifying the video stream comprises generating the graphical element such that the graphical element comprises a masked or blurred version of the portion of the identified entity.

21. The system of claim 13, wherein the video recording comprises a live video stream of the environment.

22. The system of claim 13, further comprising displaying the modified video recording to a person remotely located from the environment.

* * * * *